United States Patent [19]
Schmidt

[11] 3,834,208
[45] Sept. 10, 1974

[54] DIE CHANGING APPARATUS
[75] Inventor: Herbert K. Schmidt, Springfield, Pa.
[73] Assignee: Wean United, Inc., Pittsburgh, Pa.
[22] Filed: May 25, 1973
[21] Appl. No.: 364,172

[52] U.S. Cl. .................................. 72/263, 72/481
[51] Int. Cl. ............................................ B21c 23/00
[58] Field of Search .............. 72/263, 255, 270, 481

[56] References Cited
UNITED STATES PATENTS
| | | | |
|---|---|---|---|
| 3,314,267 | 4/1967 | Kent ..................................... | 72/270 |
| 3,431,765 | 3/1969 | Lombard ............................. | 72/263 |

Primary Examiner—C. W. Lanham
Assistant Examiner—Robert M. Rogers
Attorney, Agent, or Firm—Henry C. Westin; Daniel Patch

[57] ABSTRACT

This disclosure pertains to a die changing device for an extrusion press. The die assembly comprises a die holder, a backing plate and the die, in which connection a new die assembly is installed in the press after each extrusion operation. The new assembly is installed in the press and used while the three components of a previous assembly are automatically separated from each other and the die transferred to a cleaning and cooling station, after which the three components are automatically reassembled and held in readiness to be installed in the press for the next extrusion operation.

11 Claims, 5 Drawing Figures

DIE CHANGING APPARATUS

Forging, shaping and more particularly, extrusion presses for processing steel and employing high temperature lubricants are very often provided with mechanisms for removing the die assembly after each pressing operation in order that the die may be cleaned, and if necessary, cooled. Some of these mechanisms are designed to operate in an automatic fashion, in that the die assembly in the press is removed and conveyed away from the press while a second die assembly is transferred to and installed in the press. Such mechanisms utilize several die assemblies and require the manual removal of the die itself for the purpose of cleaning the die.

The object of the present invention is to further improve the automation of present-day die changing apparatus, in providing in a press some or all of the following operational steps: automatically removing, transferring, disengaging, cleaning, reassembling, retransferring, and reinserting of a die assembly which may comprise of two or more elements such as a holder, die backer, and die.

More particularly, the present invention provides in combination with a die containing member of a press, means for removing the die assembly from the die containing member and for transferring the assembly to a disassembling station, means in said station for disassembling a die from a die holder and die backer which three elements constitute a die assembly, means for transferring the die holder and die backer to a reassembling station, means for transferring said die from said disassembling station to a die preparation station, means after the preparation of a die is performed for transferring the prepared die to said reassembling station, means in said reassembling station for reassembling said prepared die with a holder and die backer, and means for transferring said reassembled die assembly to said die containing member.

Another object of the present invention is to provide for the removal of the die from the die assembly when in said disassembling station in a manner that the holder and die backer are separated from each other by a distance slightly in excess of the width of the die, and wherein the clean die is adapted to be positioned between said separated elements for its reassembly therewith.

A still further object of the present invention is to provide a first inclined transfer path forming part of a die assembly removing means and a second inclined transfer path forming part of the transfer means for said reassembled die assembly, said paths being superimposed relative to each other, said first path having a continuation leading to said reassembling station and the second path having a portion for receiving a reassembled die assembly from said reassembling station.

These objects, as well as other novel features and advantages, will be better appreciated when the following description of one embodiment of the present invention is read along with the accompanying drawings of which:

Figure 1:
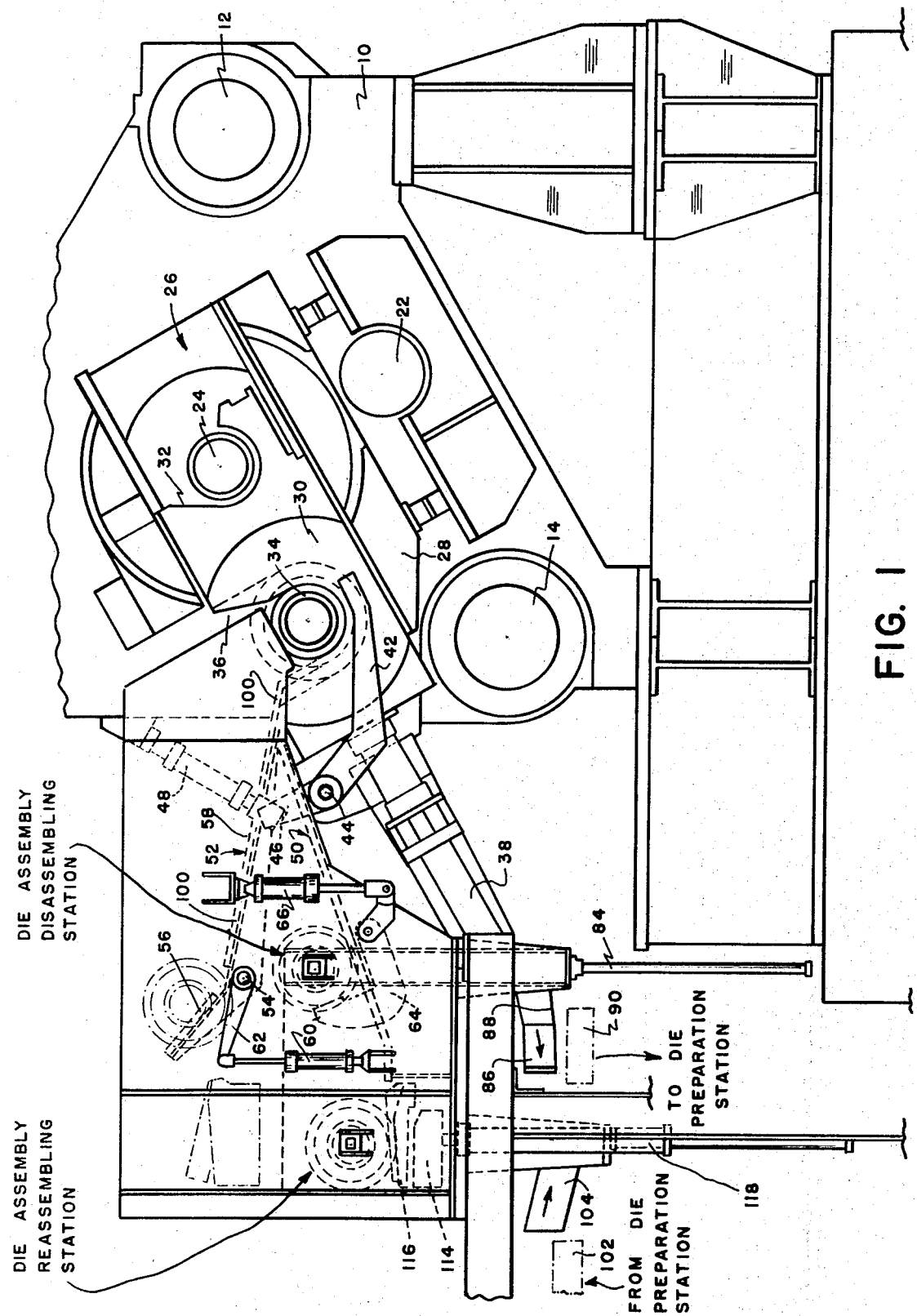
FIG. 1 is an elevational view looking at the platen of an extrusion press from the container side thereof, and illustrating a die changing apparatus constructed in accordance with the present invention.

In referring first to FIG. 1, there is illustrated a portion of a press platen 10 of an extrusion press constructed to follow familiar designs, two of the tension tie rods of which are shown at 12 and 14 together with one of the sealing piston cylinder assemblies 22 of a billet container, not shown. The center axis of extrusion of the press is designated at 24. Inclined to the horizontal plane passing through the extrusion axis 24 there is arranged a die containing member in the form of a die slide assembly 26 supported by a guiding sub-frame 28 and having a die assembly holder 30 and an auxiliary passage 32. The passage 32, according to well-known practice, registers in the retracted position of the die slide assembly 26, which position is shown in FIG. 1, with the opening 18 in the platen, to allow removal of an unextruded billet from the container in case of a so-called "sticker", that is, a billet which has cooled down below the extrusion temperature.

The die assembly holder 30 is adapted to receive a die assembly 34 in a horse-shoe shaped slot 36 having its opening extending generally upwardly. The die slide assembly 26 is advanced and retracted from the extrusion axis 24 by a piston cylinder assembly 38, whereby a used die assembly 34 can be removed from the press and a new or replacement die assembly 34 brought to the extrusion axis between the platen 10 and container, not shown. FIG. 1 illustrates the retract position of the die assembly 34 where the used die assembly can be removed from the slot 36 and a new die assembly placed therein.

The removal and replacement of the die assembly 34 from the slot 36 of the die assembly holder 30 is accomplished by a finger 42, supported by a shaft 44, its free end being arranged to extend below the bottom portion of the die assembly when the die assembly 26 is retracted, as shown in FIG. 1, and its other end being provided with an arm 46 which is connected to a platen supported piston cylinder assembly 48.

As can be seen from FIG. 1, the finger 42, when raised cooperates with two inclined runways, the lower one being designated 50 and the upper one at 52. The runway 50 is declined and stationarily mounted serving to carry a used die assembly away from the press, while the runway 50 is generally inclined and pivotally mounted on a shaft 54 so as to form two legs 56 and 58, which are raised and lowered, serving to convey a new or replacement die assembly to the press. The movement of the runway 52 is performed by the agency of a piston cylinder assembly 60 connected to an arm 62 which, in turn, is connected to the shaft 54.

Figure 2:
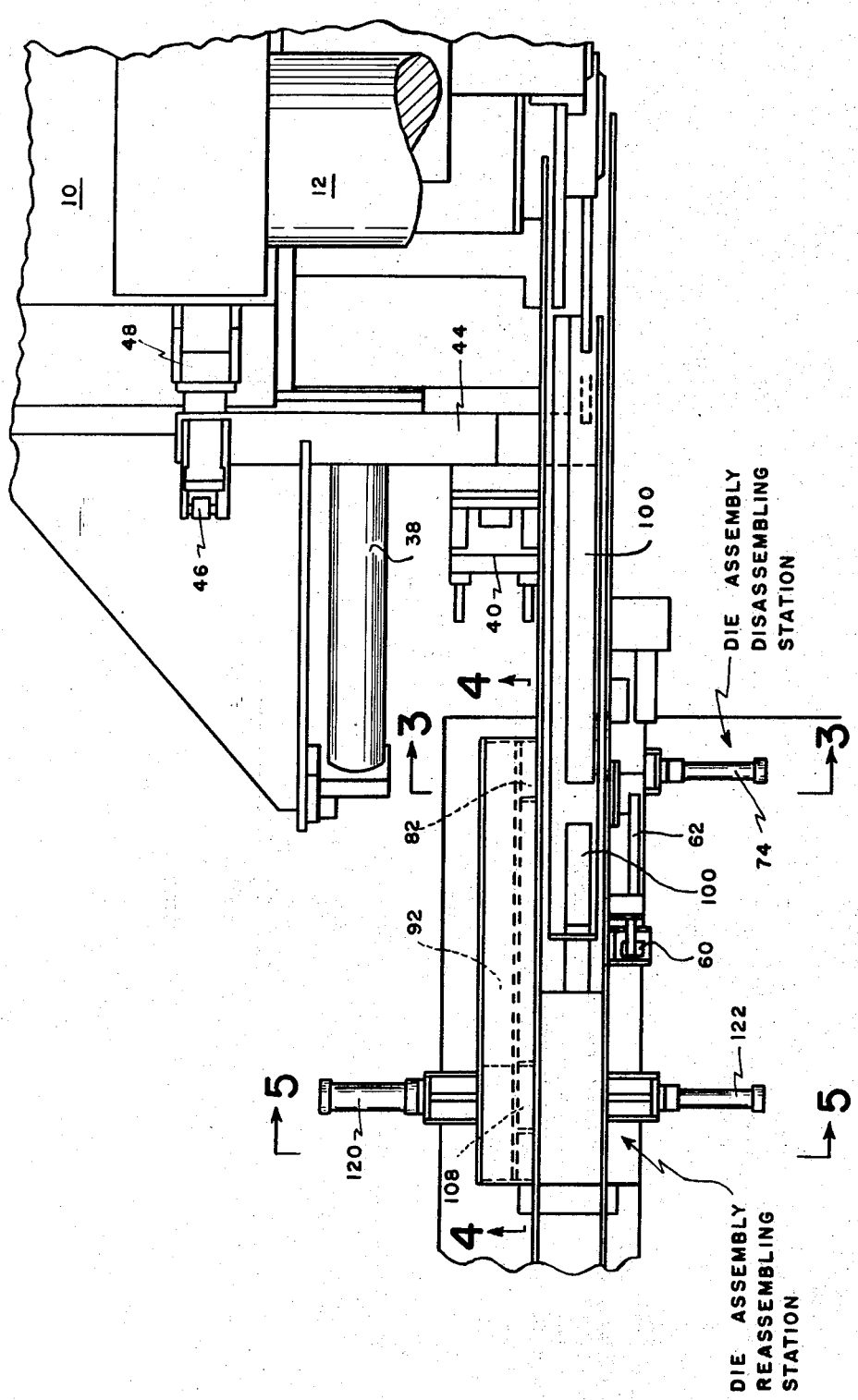
FIG. 2 is a partial plan view of the apparatus shown in FIG. 1.
Figure 3:
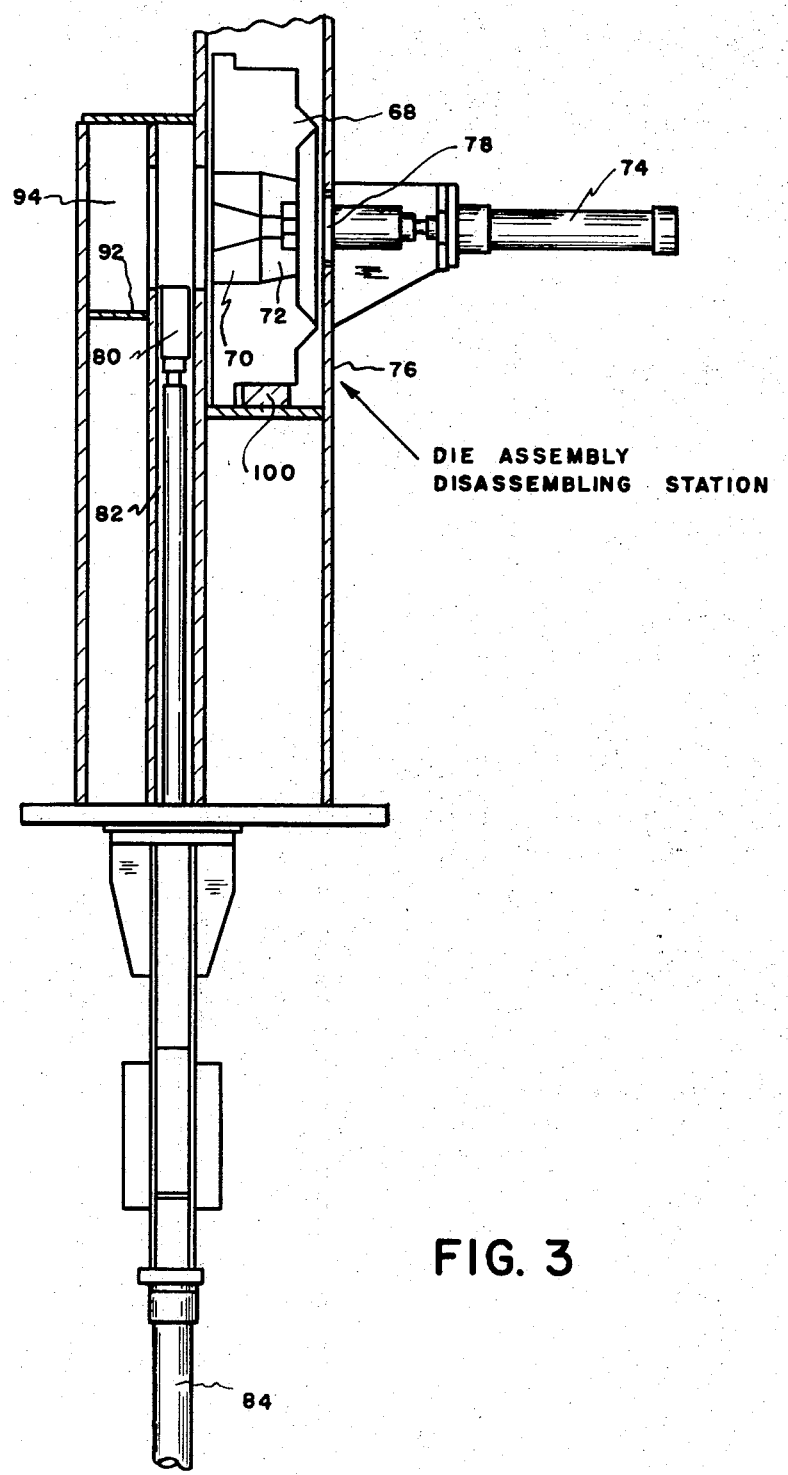
FIG. 3 is a sectional view taken on lines 3—3 of FIG. 2.
Figure 4:
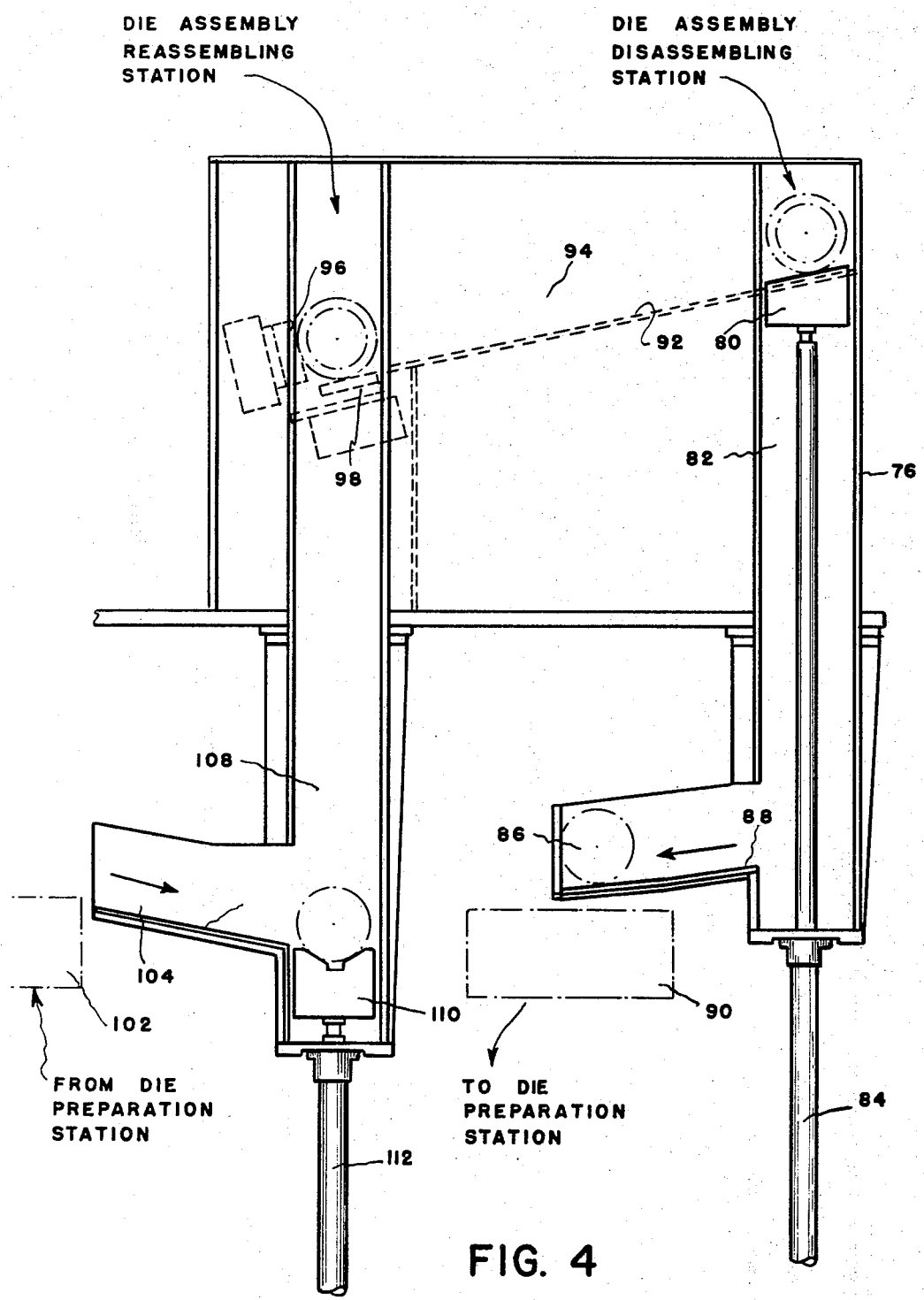
FIG. 4 is a sectional view taken on lines 4—4 of FIG. 2.
Figure 5:
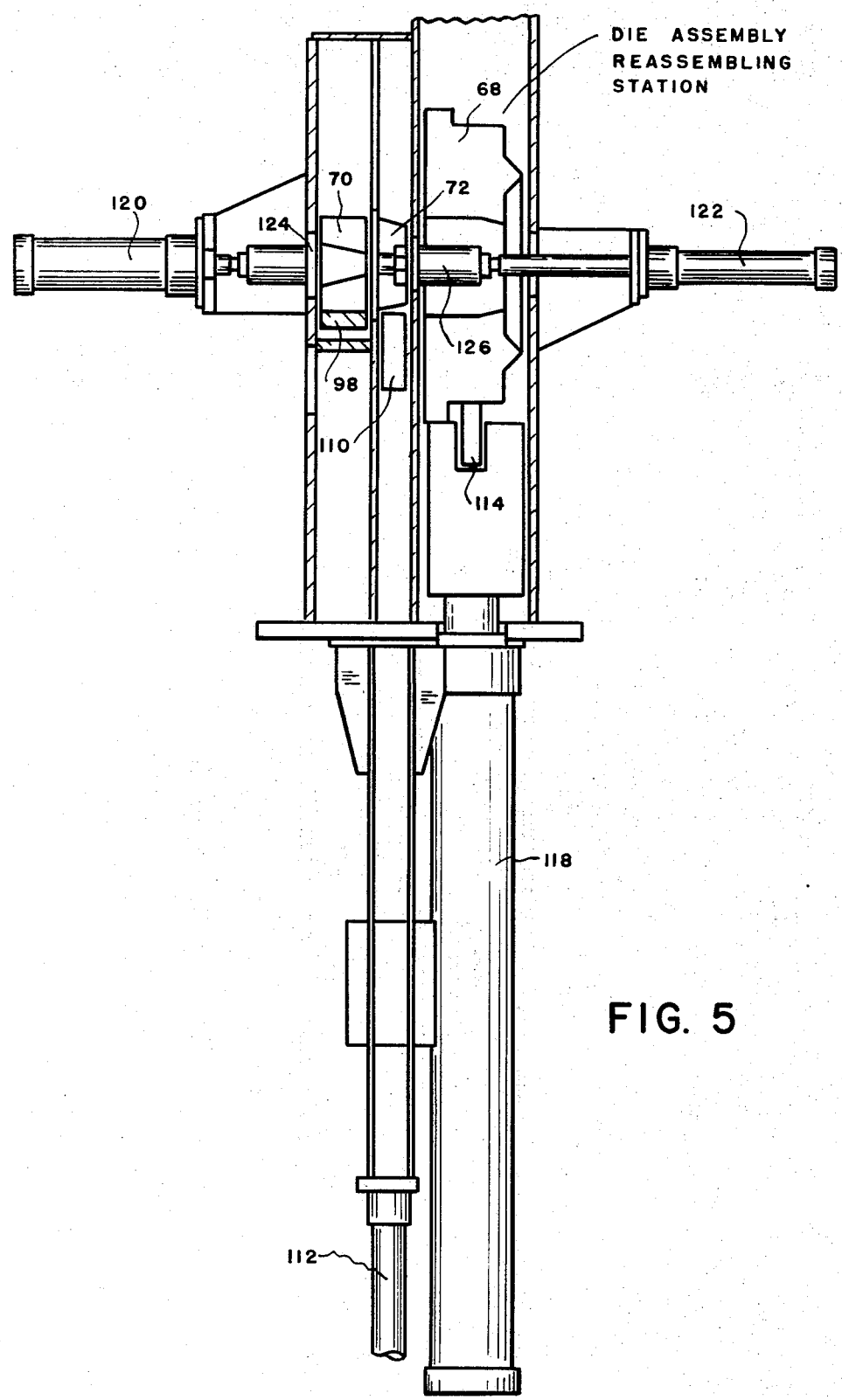
FIG. 5 is a sectional view taken on lines 5—5 of FIG. 2.

Pursuing the equipment associated with the runway 50 and still referring to FIG. 1, midway between the end of this runway, there is located a Die Assembly Disassembling Station which is so legended in FIG. 1, as well as in FIGS. 2, 3, and 4. In this station there is provided an L-shaped pivotally mounted stop 64 adapted to project into the runway 50 in one position, as shown in FIG. 1, and to be lowered below the runway, both movements being performed by a piston cylinder assembly 66 connected to the stop 64.

Also in the Disassembling Station and as best shown in FIG. 3 where the three components of the die assembly are also illustrated consisting of a die holder 68, having a central opening for receiving a die backer 70 and a die 72, there is provided a piston cylinder assembly 74 for pushing the die and die backer out of the opening of the die holder. This cylinder supported by an up-right frame 76 faces the container side of the die holder and has a collar 78 attached to its piston rod for engaging the adjacent surface of the die 72. On the platen side of the die holder 68 there is provided an inclined die carrying member 80, shown best in FIG. 4, which is received in a vertical chute 82 into which it is raised and lowered by a piston cylinder assembly 84, the lower end of the chute having an exit opening 86 formed with an inclined surface 88 that serves as a continuation of the inclined surface of the die carrying member 80 when in its lower position. As schematically shown in FIG. 4, the exit opening 86 serves to deposit a die 72 onto a conveyor 90 that is part of a Die Preparation Station identified also by legend in FIG. 4. In this station the die, while carried and transferred by the conveyor, is cooled, cleaned and inspected.

Returning again to the Die Assembly Disassembling Station, it will be noted in FIG. 3 on operation of the piston cylinder assembly 74 that the die backer 70 precedes the die 72 when they are pushed out of the die holder 68. Accordingly, the die backer 70 is allowed to slide over the carrying member 80 into a downward inclined runway 92 formed as part of a passageway 94, the lower end of which terminates in a Die Assembly Reassembling Station which is legended in FIGS. 1, 2, 4 and 5, at which end there is arranged an abutment 96 and support 98, shown best in FIG. 4.

Again referring to FIG. 3, once the die backer 70 and the die 72 are removed from the die holder 68, the holder can be transferred to the Reassembling Station. FIG. 3 shows that the holder 68 has a reduced portion which allows it to be supported in a flange-wheel like fashion by rails 100 mounted in both of the runways 50 and 52 as well as the lead in portion of the horse-shoe shaped opening 36 of the die slide assembly 26. By this construction, upon the lowering of the stop 64, a used die 72, is allowed to roll down into the Die Assembly Reassembling Station.

The relative positions of the die holder 68 and the die backer 70 can be better appreciated in referring to FIG. 2 where the rails 100 that support and guide the holder are shown and where the runway 92 is shown in spaced relationship to the rails 100. The distance between these two members is slightly greater than the width of a die, thus allowing a die to be inserted between a die backer and holder as will be explained later on, in which a clean die is brought back and positioned between the die holder and die backer.

FIG. 4 best illustrates that the Die Assembly Reassembling Station cooperates with a Die Return Conveyor 102 forming part of a Die Preparation Station which is legended in FIG. 4. This conveyor, as in the case of the conveyor 90, supports and transfers the cleaned, cooled and inspected die from the Preparation Station back to its die backer and holder. The conveyor 102 communicates with an opening in a die return chute 104 having a declining die supporting surface 106 which allows a die to roll down into a chute 108, where it will be supported by a V-shaped carrying member 110. The carrying member 110 is raised and lowered by a piston cylinder assembly 112, in which in its raised position a supported die is brought to the Die Assembly Reassembling Station and between a die backer 70 and a die holder 68.

FIG. 5 illustrates again the three elements of the die assembly in their supported positions preparatory to their reassembly with each other. As shown, in their proper order for insertion into the holder 68, the die backer 70 is supported by the member 98, the die by the member 110, and the holder by a supporting member 114. This member is shown best in FIG. 1 comprising a die holder contacting and lifting bar 116 that engages the reduced portion of the die holder, being pivoted at the right side to the member 114 as can be seen in phantom in FIG. 1. The member 114 is connected to the piston rod of a piston cylinder assembly 118.

Returning to FIG. 5, at each side of the rearranged elements of the die assembly 34 positioned for reassembly and horizontally disposed are two opposed piston cylinder assemblies 120 and 122, the piston cylinder assembly 120 having a pusher element 124 that engages the adjacent face of a die backer 70. Likewise, the piston cylinder assembly 122 has an element 126 connected to its piston rod adapted to pass through the central opening in the die holder 68 to where the element 126 contacts the adjacent face of a die 72. In reassembling the die assembly 34, the piston cylinder assembly 120 is operated first to push the die backer against the die, which in turn is pushed against the element 126 of the piston cylinder assembly 122. This piston cylinder assembly is operated to resist this movement and give stability to the die as it is forced into the holder but no sufficient resistance is offered to prevent the piston cylinder assembly 120 from pushing the backer and die completely into the die holder 68.

Once this assembly is completed, the piston cylinder assembly 118 is operated to lift the die assembly out of the Reassembling Station to the elevated position. As the supporting member 114 reaches the upper position, the lifting bar 116 will contact a stop, not shown, to cause it to pivot and transfer the die assembly 34 to the lowered leg 56 of the runway 52, and thus assume the supported position shown in phantom in FIG. 1 in readiness to be conveyed to the die slide 26.

When the previous die assembly 34 in the press has been retracted by the die slide 26 and removed therefrom by operation of the finger 42, the new die assembly 34 can be rolled into the slot 36 of the die assembly holder 30 by operation of the piston cylinder assembly 60 to raise the leg 56 and lower the leg 58 of the runway 52, the finger being employed to cushion the lowering into the die assembly holder 30, if desired.

In accordance with the provisions of the patent statutes, I have explained the principle and operation of my invention and have illustrated and described what I consider to represent the best embodiment thereof.

I claim:

1. In combination with a die containing member of a press adapted to transfer a die assembly to and from the press, said die assembly constituting at least two elements, means for removing a die assembly from said die containing member which includes means for transferring the removed assembly to a disassembling station, means in said station for disassembling the elements that makeup the die assembly, means for transferring said disassembled elements to a reassembling station, means in said reassembling station for assembling said elements, and means for transferring said reassembled die assembly to said die containing member.

2. In combination with a die containing member according to claim 1 including, means for transferring the disassembled die of said die assembly to a die preparation station, this transfer means including means after the preparation of a die is performed for transferring the prepared die to said reassembling station.

3. In combination with a die containing member of a press adapted to transfer die assembly to and from the press, said die assembly comprising a die, a die backer and a die and backer holder, means for removing the die assembly from said die containing member and for transferring the assembly to a disassembling station, means in said station for disassembling said elements of said die assembly, means for transferring the die holder and die backer to a reassembling station, means for transferring said die from said disassembling station to a die preparation station, means after the preparation of a die is performed for transferring the prepared die to said reassembling station, means in said reassembling station for reassembling said prepared die with said holder and said die backer, and means for transferring said reassembled die assembly to said die containing member.

4. In combination with a die containing member according to claim 3 wherein said means for transferring the assembly to said disassembling station comprises a declining runway extending between said die containing member and said disassembling station, said means for transferring a reassembled die to said die containing member comprising an inclining runway extending between said reassembling station and said die containing member, said means for removing the die assembly from said die containing member comprising a finger member, and means for moving said finger so that in one direction of movement said finger will transfer a die assembly from the die containing member to said declining runway and in a second direction of movement said finger will transfer a die assembly to said die containing member from said inclining runway.

5. In combination with a die containing member according to claim 4 wherein said disassembling station and reassembling station are spaced along said declining runway, said disassembling station being arranged between the ends thereof and including a die assembly stop means arranged in said disassembling station for selectively preventing said die holder of said assembly from passing into said reassembling station, power means in said disassembling station for removing said die and die backer from a die holder, a second declining runway for receiving and transferring a disassembled die backer from said disassembling station to said reassembling station, and means for supporting a disassembled die for removing it from said disassembling station to allow said die to be conveyed to a die preparation station.

6. In combination with a die containing member according to claim 4 wherein said disassembling station and said reassembling station are spaced along said declining runway, said reassembling station being arranged at the lower end of said runway and including means for receiving and transferring a die received from a die preparation station to a preselected position relative to a die backer and die holder arranged in said reassembling station, means in said preselected position for supporting a die backer and die holder in a position for reassembly with a preselected positioned die, means in said preselected position for causing said die and die backer to be reassembled with said die holder, and means for transferring said assembled die assembly to said inclining runway.

7. In combination with a die containing member according to claim 5 wherein declining runway and said second declining runway are spaced from each other a distance slightly greater than the width of a die, and wherein said means for supporting said disassembled die is located in said spacing.

8. In combination with a die containing member according to claim 6 wherein said declining runway and said second declining runway are spaced from each other a distance greater than the width of a die, and wherein said means for receiving and transferring the die is located in said opening.

9. In combination with a die containing member according to claim 4 wherein said disassembling station and reassembling station are spaced along said declining runway, said disassembling station being arranged between the ends of said declining runway and including a die assembly stop means arranged in said disassembling station for selectively preventing said die holder of said assembly from passing into said reassembling station, power means in said disassembling station for removing said die and die backer from a die holder, a second declining runway for receiving and transferring a disassembled die backer from said disassembling station to said reassembling station, and means for supporting a disassembled die for removing it from said disassembling station to allow said die to be conveyed to a die preparation station, said reassembling station being arranged at the lower end of said first declining runway and including means for receiving and transferring a die received from a die preparation station to a preselected position relative to a die backer and die holder arranged in said reassembling station, means in said preselected position for supporting a die backer and die holder in a position for reassembly with a preselected positioned die, means in said preselected position for causing said die and die backer to be reassembled with said die holder, and means for transferring said assembled die assembly to said inclining runway.

10. In combination with a die containing member according to claim 9 wherein said means for receiving and transferring a die is arranged to one side of said first declining runway and adapted to support a die when disassembled from said die holder,
   means for lowering said die receiving means from a position where it receives a die to a position adjacent a conveyor of said die preparation station,
   wherein said means for preselectively positioning a die is arranged on one side of said first declining runway and adapted to bring a die adjacent a die holder supported by said runway, and
   means for raising said preselectively positioned die positioning means from a position where it receives a die from said conveyor of said die preparation station to a position in said reassembling station.

11. In combination with a die containing member according to claim 10 wherein said position of said portion of said first declining runway that supports a die holder in said reassembling station comprising a vertically movable carrying member,
   means for moving said carrying member from said reassembling station to a position where the assembled die assembly is adjacent the upper end of said inclining runway, and
   means for transferring the assembled die assembly from said carrying member to said inclining runway.

* * * * *